US011852392B2

(12) United States Patent
Donnellan et al.

(10) Patent No.: US 11,852,392 B2
(45) Date of Patent: Dec. 26, 2023

(54) SPEED CONTROL STRATEGIES FOR A CONDENSER FAN IN A REFRIGERATION SYSTEM

(71) Applicant: THERMO KING LLC, Minneapolis, MN (US)

(72) Inventors: Wayne Donnellan, Galway (IE); Premchand Reddy Punuru, Guntur (IN); Michael Greene, Minneapolis, MN (US); James E Conde, Plymouth, MN (US)

(73) Assignee: THERMO KING LLC, Minneapolis, MN (US)

( * ) Notice: Subject to any disclaimer, the term of this patent is extended or adjusted under 35 U.S.C. 154(b) by 329 days.

(21) Appl. No.: 17/191,300

(22) Filed: Mar. 3, 2021

(65) Prior Publication Data

US 2021/0278115 A1    Sep. 9, 2021

(30) Foreign Application Priority Data

Mar. 5, 2020   (EP) .................................... 20161341

(51) Int. Cl.
*F25B 49/02*       (2006.01)
*F25B 39/00*       (2006.01)

(52) U.S. Cl.
CPC ............ *F25B 49/027* (2013.01); *F25B 39/00* (2013.01); *F25B 2500/18* (2013.01); *F25B 2600/111* (2013.01); *F25B 2700/15* (2013.01); *F25B 2700/171* (2013.01); *F25B 2700/172* (2013.01); *F25B 2700/173* (2013.01); *F25B 2700/195* (2013.01); *F25B 2700/1933* (2013.01); *F25B 2700/21162* (2013.01); *F25B 2700/21174* (2013.01)

(58) Field of Classification Search
CPC .... F25B 49/027; F25B 39/00; F25B 2500/18; F25B 2600/111; F25B 2700/15; F25B 2700/172; F25B 2700/171; F25B 2700/173; F25B 2700/1933; F25B 2700/195; F25B 2700/21162; F25B 2700/21174
See application file for complete search history.

(56) References Cited

U.S. PATENT DOCUMENTS

| 9,823,632 B2 * | 11/2017 | Pham ..................... G05B 15/02 |
| 2001/0054294 A1 * | 12/2001 | Tsuboi .................... F04C 28/08 |
| | | 62/228.4 |

(Continued)

FOREIGN PATENT DOCUMENTS

| WO | 2008/100255 | 8/2008 |
| WO | 2009/140372 | 11/2009 |
| WO | 2016/138382 | 9/2016 |

OTHER PUBLICATIONS

Extended European Search Report, issued in the corresponding EP patent application No. 20161341.1, dated Sep. 16, 2020, 6 pages.

*Primary Examiner* — Nelson J Nieves
(74) *Attorney, Agent, or Firm* — Hamre, Schumann, Mueller & Larson, P.C.

(57) ABSTRACT

There is disclosed a refrigeration system comprising a refrigeration circuit that includes a compressor, a condenser, an expansion valve and an evaporator. A condenser fan of the refrigeration system is configured to operate, under the control of a controller, at a condenser fan speed that is set based on a current refrigeration demand on the system.

11 Claims, 7 Drawing Sheets

(56) References Cited

U.S. PATENT DOCUMENTS

| | | | | |
|---|---|---|---|---|
| 2003/0000236 A1* | 1/2003 | Anderson | ............... | F25B 27/00 |
| | | | | 62/323.3 |
| 2007/0227167 A1* | 10/2007 | Shapiro | ................ | F25B 49/022 |
| | | | | 62/175 |
| 2007/0245753 A1* | 10/2007 | Landers | ................ | F25B 49/022 |
| | | | | 62/228.3 |
| 2011/0016893 A1* | 1/2011 | Dawes | ................... | G05B 15/02 |
| | | | | 700/275 |
| 2011/0083454 A1* | 4/2011 | Kopko | ................. | F25B 49/027 |
| | | | | 62/181 |
| 2013/0186119 A1* | 7/2013 | Burns | .................... | F25B 49/02 |
| | | | | 62/157 |
| 2014/0180483 A1* | 6/2014 | Cheng | ..................... | F24F 11/86 |
| | | | | 700/278 |
| 2015/0047381 A1* | 2/2015 | Fujimoto | .............. | F25B 49/022 |
| | | | | 62/186 |
| 2015/0330690 A1* | 11/2015 | Goel | ......................... | F25B 7/00 |
| | | | | 62/175 |
| 2017/0057323 A1* | 3/2017 | Neu | ....................... | F25B 49/02 |
| 2017/0227263 A1* | 8/2017 | Kopko | ................. | F25B 25/005 |
| 2018/0245822 A1* | 8/2018 | Punuru | .................... | F25B 5/02 |
| 2019/0301780 A1* | 10/2019 | Schmidt | ................ | F25B 49/02 |
| 2020/0240694 A1* | 7/2020 | Mullin | ................... | G05B 17/02 |
| 2021/0025631 A1* | 1/2021 | Mullin | ................... | F25B 31/02 |
| 2021/0055026 A1* | 2/2021 | Kim | ........................ | F24F 1/26 |
| 2021/0372679 A1* | 12/2021 | Lee | ....................... | F25B 49/025 |
| 2022/0082304 A1* | 3/2022 | Welch | ....................... | F25B 5/02 |
| 2022/0186944 A1* | 6/2022 | Kirkman | ............. | F28F 27/003 |
| 2022/0196309 A1* | 6/2022 | Kirkman | ................ | F25B 49/02 |

* cited by examiner

SPEED CONTROL STRATEGIES FOR A CONDENSER FAN IN A REFRIGERATION SYSTEM

The present disclosure relates to a refrigeration system, such as a transport refrigeration system, and in particular to speed control strategies fora condenser fan in a refrigeration system.

BACKGROUND

Refrigeration systems generally include a refrigeration circuit that includes a compressor, a condenser, an expansion valve and an evaporator. The refrigeration circuit generally defines a flow of refrigerant that is to be used to control the temperature of a space to be refrigerated. The refrigerant flow can be said to begin at the compressor, which compresses the refrigerant to form a superheated refrigerant gas. The superheated refrigerant gas is then delivered to the condenser, which is in thermal communication with a cooler ambient environment so that heat is removed from the refrigerant to the ambient environment. The refrigerant, which at this point has condensed to a liquid, is delivered from the condenser to the evaporator via the expansion valve. The evaporator is in thermal communication with the space to be refrigerated. As air within the space circulates over the evaporator, the liquid phase refrigerant evaporates and absorbs heat from the air in order to cool the space. To complete a cycle about the refrigeration circuit, the refrigerant is delivered from the evaporator back to the compressor via an electronic throttling valve, for example.

Typically, a condenser fan is provided to circulate air over the condenser in order to aid the removal of heat from the refrigerant. Conventionally, the condenser fan is mechanically or electrically coupled to a prime mover of the refrigeration system and is set to operate at fixed, i.e. non-variable, speeds that are fixed ratios of the prime mover speeds. There are usually at least two prime mover speeds available, e.g. high-speed and low-speed, and the condenser fans will proportionally have two speeds also.

The fixed fan speeds are selected to ensure that a sufficient mass of air is circulated over the condenser during worst case operating conditions. For example, the condenser fan may be set to operate at a fixed speed that has been set sufficiently high to meet the maximum potential heat rejection needs of the system. High heat rejection typically occurs when the refrigeration system's capacity is high, such as during a pull-down mode of operation due to a warm refrigeration space. In higher ambient temperatures, heat rejection is more difficult and typically requires more airflow so the condenser fan is set at an appropriate fixed speed for that. However, much of the time the system is not in pull-down mode but is instead maintaining a given temperature by performing continuous refrigeration modulation, for example, wherein refrigeration capacity and hence heat rejection are much lower. Also, ambient temperatures are often not as high as those designed for in the worst case scenario.

As a result, the speed and thus power consumption of a condenser fan in conventional refrigeration systems is often higher than what is necessary to meet the current heat rejection needs of the system, e.g. when the current refrigeration demand is lower than the maximum potential refrigeration capacity to which the fixed speeds correspond.

It is therefore desired to provide improved speed control for a condenser fan.

SUMMARY

According to an aspect of the present disclosure, there is provided a refrigeration system comprising: a refrigeration circuit that includes at least a compressor, a condenser, an expansion valve and an evaporator; a variable-speed condenser fan; and a controller configured to, in a first mode of operation, monitor a refrigeration demand of the refrigeration system (e.g. using one or more sensors) and to set a speed of the condenser fan based on the current refrigeration demand of the system.

The controller may be configured to: monitor a set of operating parameters of the refrigeration circuit that is indicative of the refrigeration demand; and set the condenser fan speed based on the current values of the set of operating parameters.

The set of operating parameters (that is monitored and used to set the condenser fan speed) may include one or more (and in embodiments all) of a compressor speed, a condenser air inlet temperature, an evaporator air inlet temperature, an evaporator fan speed and a throttling valve position. Alternatively, the set of operating parameters (that is monitored and used to set the condenser fan speed) may include one or more (and in embodiments all) of a compressor speed, a compressor suction pressure, a condenser discharge pressure and a throttling valve position.

The controller may be configured to: monitor a first set of operating parameters and a second, different set of operating parameters, each of which is indicative of the refrigeration demand; and set the condenser fan speed based on the current values of the first set of operating parameters interchangeably with the current values of the second set of operating parameters.

The controller may be configured to: set the condenser fan speed based on the current values of the first set of operating parameters as a default in the first mode of operation, and to set the condenser fan speed based on the current values of the second set of operating parameters if the controller detects a failure of one or more sensors for monitoring the first set of operating parameters.

The controller may be configured to set the speed of the condenser fan based on a predetermined model of system efficiency, which may be a function of the set of operating parameters and condenser fan speed. The predetermined model may be a metamodel that has been predetermined based on a statistical analysis of a set of simulation data that represents the system efficiency across an operating map of the refrigeration system.

The controller may be configured to set the speed of the condenser fan based on a predetermined relationship between the current operating parameter values and a condenser fan speed at which system efficiency will be at its maximum for the current operating parameter values.

The predetermined relationship may have been determined by performing a regression analysis using the predetermined model. The predetermined relationship may have been determined by (e.g. a computer processor): using the predetermined model (e.g. metamodel) to determine, for respective permutations of operating parameter values, respective condenser fan speeds at which system efficiency will be at its maximum; and fitting a (e.g. curve) function to the respective condenser fan speeds at which system efficiency will be at its maximum for the respective permutations; and storing the function in memory, to be used by the controller.

The predetermined relationship may be in the form of a regression model (e.g. the function determined by performing the regression analysis described above), which may be stored in a memory that is accessible by the controller. The regression model may be stored in a memory of the controller itself. The controller may be configured to: input the current operating parameter values into the regression model; receive, as an output from the regression model, the condenser fan speed at which the system efficiency will be at its maximum for the current operating parameter values; and set the condenser fan to operate at a speed that is selected based on the condenser fan speed at which the system efficiency will be at its maximum for the current operating parameter values.

Instead of a regression model, the predetermined relationship may be in the form of a lookup table, which may be stored in a memory that is accessible by the controller. The lookup table may be stored in a memory of the controller itself. The controller may be configured to: identify an entry in the lookup table that corresponds to the current operating parameter values; read from the entry data that is indicative of the condenser fan speed at which the system efficiency will be at its maximum for the current operating parameter values; and set the condenser fan to operate at a speed that is selected based on the condenser fan speed at which the system efficiency will be at its maximum for the current operating parameter values.

The controller may be configured to set the speed of the condenser fan based on the predetermined model of system efficiency by: performing an optimisation algorithm using the predetermined model, to determine a condenser fan speed at which system efficiency will be at its maximum for the current operating parameter values.

Performing the optimisation algorithm may comprise: for each condenser fan speed of a group of predefined condenser fan speeds: inputting the condenser fan speed in question and the current operating parameter values into the predetermined model of system efficiency; and receiving as output data from the predetermined model of system efficiency a refrigeration capacity value and a fuel or power consumption value. It may further comprise: determining, based on the output data for the group of predefined condenser fan speeds, the predefined condenser fan speed for which the corresponding refrigeration capacity value and fuel or power consumption value yields the greatest system efficiency.

The refrigeration system may comprise a power source for supplying power to at least the controller and the condenser fan. Further, the controller may be configured to, in a second mode of operation: determine, based on the current power consumption and a predefined maximum power capacity of the power source, an excess power capacity (currently) available from the power source; determine a maximum speed at which the condenser fan can operate when utilizing the excess power capacity from the power source; and set the condenser fan to operate at the determined maximum speed.

According to another aspect, there is provided a method of operating a variable-speed condenser fan of a refrigeration system, which comprises a refrigeration circuit that includes at least a compressor, a condenser, an expansion valve and an evaporator; the method comprising a controller, when operating in a first mode of operation: monitoring a current refrigeration demand of the refrigeration system and setting a speed of the condenser fan based on the current refrigeration demand of the system.

The method may further comprise the controller: monitoring a set of operating parameters of the refrigeration circuit that is indicative of the refrigeration demand; and setting the condenser fan speed based on the current values of the set of operating parameters.

As mentioned above, the set of operating parameters may include one or more of a compressor speed, a condenser air inlet temperature, an evaporator air inlet temperature, an evaporator fan speed and a throttling valve position. Alternatively the set of operating parameters may include one or more of a compressor speed, a compressor suction pressure, a condenser discharge pressure and a throttling valve position.

The controller may monitor a first set of operating parameters and a second, different set of operating parameters, each of which is indicative of the refrigeration demand; and set the condenser fan speed based on the current values of the first set of operating parameters interchangeably with the current values of the second set of operating parameters.

The controller may set the condenser fan speed based on the current values of the first set of operating parameters as a default in the first mode of operation, and may set the condenser fan speed based on the current values of the second set of operating parameters if the controller detects a failure of one or more sensors for monitoring the first set of operating parameters.

The controller may set the speed of the condenser fan based on a predetermined model of system efficiency, which may be a function of the set of operating parameters and condenser fan speed. As described above, the predetermined model may be a metamodel that has been predetermined based on a statistical analysis of a set of simulation data that represents the system efficiency across an operating map of the refrigeration system. Thus, in embodiments the method comprises the step of performing the statistical analysis of a set of simulation data that represents the system efficiency across an operating map of the refrigeration system.

The controller may set the speed of the condenser fan based on a predetermined relationship between the current operating parameter values and a condenser fan speed at which system efficiency will be at its maximum for the current operating parameter values. The predetermined relationship may have been determined by performing a regression analysis using the predetermined model. Thus, in embodiments, the method may comprise the step of performing the regression analysis using the predetermined model.

The predetermined relationship may be in the form of a regression model, which is stored in a memory that is accessible by the controller. In that case, the method may further comprise the controller: inputting the current operating parameter values into the regression model; receiving, as an output from the regression model, the condenser fan speed at which the system efficiency will be at its maximum for the current operating parameter values; and setting the condenser fan to operate at a speed that is selected based on the condenser fan speed at which the system efficiency will be at its maximum for the current operating parameter values.

Instead of a regression model, the predetermined relationship may be in the form of a lookup table, which is stored in a memory that is accessible by the controller. In that case, the method may further comprise the controller: identifying an entry in the lookup table that corresponds to the current operating parameter values; reading from the entry data that is indicative of the condenser fan speed at which the system efficiency will be at its maximum for the current operating parameter values; and setting the condenser fan to operate at a speed that is selected based on the condenser fan speed at which the system efficiency will be at its maximum for the current operating parameter values.

The controller may set the speed of the condenser fan based on the predetermined model of system efficiency by: performing an optimisation algorithm using the predetermined model, to determine a condenser fan speed at which system efficiency will be at its maximum for the current operating parameter values.

Where the refrigeration system comprises a power source for supplying power to at least the controller and the condenser fan, the method may further comprise the controller, when operating in a second mode of operation: determining, based on the current power consumption and a predefined maximum power capacity of the power source, an excess power capacity available from the power source; determining a maximum speed at which the condenser fan can operate when utilizing the excess power capacity from the power source; and setting the condenser fan to operate at the determined maximum speed.

In the above embodiments, the system efficiency may be with respect to a refrigeration system that utilises power generated by a combustion engine. In that case, the system efficiency may be defined as the ratio of net refrigeration capacity (in units of Watt) to fuel consumption (in units of litres per hour). Additionally or alternatively, the system efficiency may be with respect to a refrigeration system that utilises power generated by an on-board electric motor. In that case, the system efficiency may be defined as the ratio of net refrigeration capacity (in units of Watt) to power consumption (in units of Watt).

The various units or components described herein, such as the unit controller, may be coupled to one another via a wireless link and may consequently comprise transceiver circuitry and one or more antennas. Additionally or alternatively, the units described herein may be coupled to one another via a wired link and may consequently comprise interface circuitry (such as a Universal Serial Bus (USB) socket). It should be appreciated that the units described herein may be coupled to one another via any combination of wired and wireless links.

The various units described herein may comprise any suitable circuitry to cause performance of the methods described herein and as illustrated in the Figures. The modules may comprise: at least one application specific integrated circuit (ASIC); and/or at least one field programmable gate array (FPGA); and/or single or multi-processor architectures; and/or sequential (Von Neumann)/parallel architectures; and/or at least one programmable logic controllers (PLCs); and/or at least one microprocessor; and/or at least one microcontroller; and/or a central processing unit (CPU); and/or a graphics processing unit (GPU), to perform the methods.

The various units may comprise and/or be in communication with one or more memories, e.g. non-transitory computer readable storage mediums, that store the data described herein, and/or that store software (computer readable instructions) for performing the processes described herein.

BRIEF DESCRIPTION OF THE DRAWINGS

The present disclosure will now be described by way of example with reference to the accompanying drawings, in which.

DETAILED DESCRIPTION

Figure 1:
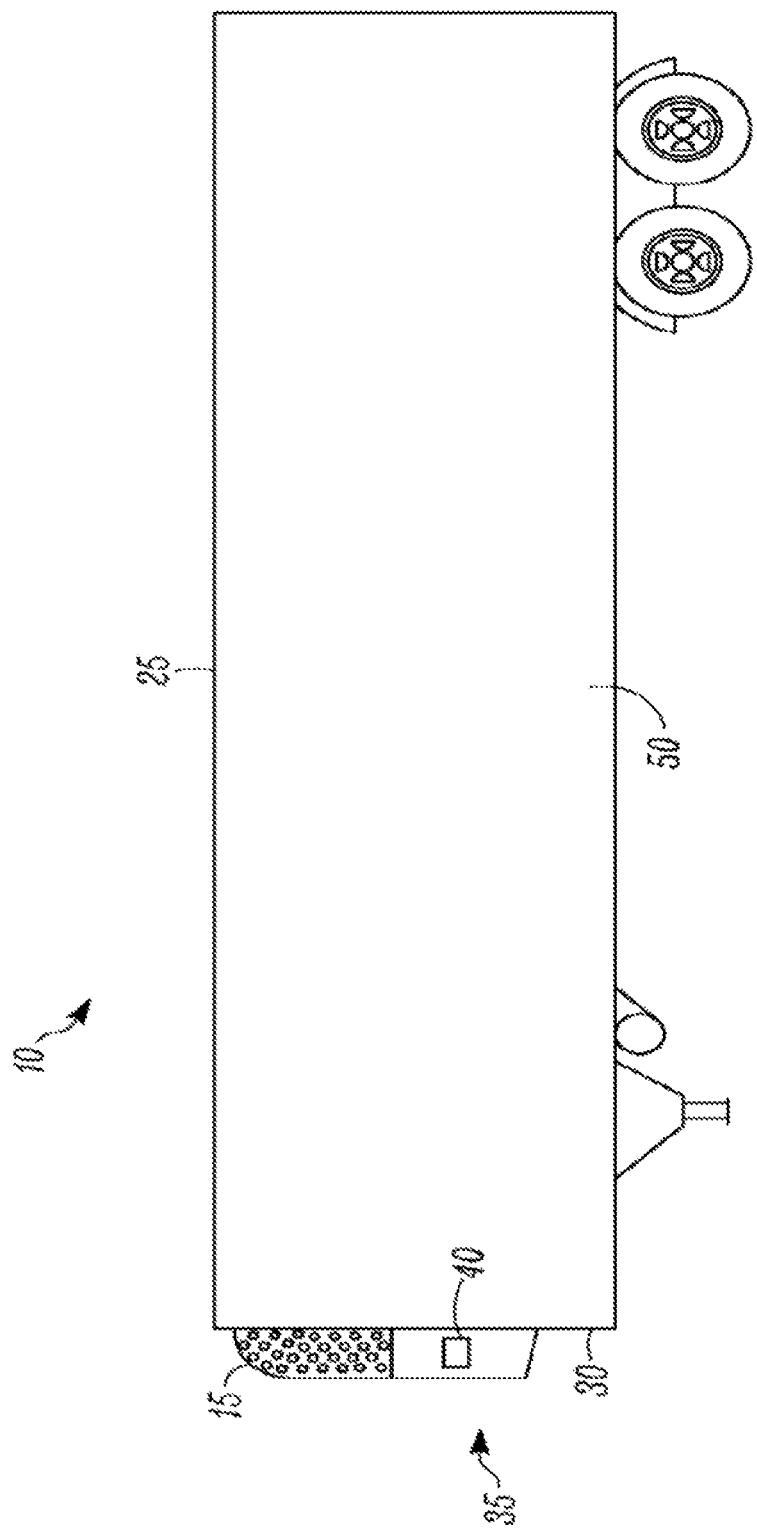
FIG. 1 is a side view of a transport refrigeration system (TRS), according to an embodiment.

FIG. 1 is a side view of a transport refrigeration system (TRS) 10 for a transport unit 25, also known as a "Reefer", according to an embodiment. The illustrated transport unit is a trailer-type transport unit. However, embodiments as described in this specification can be used with other types of transport units. For example, the transport unit 25 can represent a container (e.g., a container on a flat car, an intermodal container, etc.), a truck, a boxcar, or other similar type of transport unit having an interior space that can be environmentally controlled.

The TRS 10 includes a refrigeration unit, referred to hereafter as a transport refrigeration unit (TRU) 15. The TRU 15 is provided on a front wall 30 of the transport unit 25 (although the TRU 15 could be provided elsewhere) and is configured to control one or more environmental conditions such as, but not limited to, temperature, humidity, and/or air quality of an interior space 50 of the transport unit 25. In an embodiment, the interior space 50 can alternatively be referred to as the conditioned space 50, the cargo space 50, the environmentally controlled space 50, a box 50, or the like. In particular, the TRU is configured to transfer heat from the air inside the interior space 50 to the ambient air outside of the transport unit 25.

The interior space 50 can include one or more partitions or internal walls (not shown) for at least partially dividing the interior space 50 into a plurality of zones or compartments, according to an embodiment. It is to be appreciated that the interior space 50 may be divided into any number of zones and in any configuration that is suitable for refrigeration of the different zones. In some examples, each of the zones can have a set point temperature that is the same or different from one another.

The TRU 15 includes a programmable unit controller 35 that includes a single integrated control unit 40. It will be appreciated that in other embodiments, the unit controller 35 may include a distributed network of TRU control elements (not shown). The unit controller 35 can include a processor, a memory, a clock, and an input/output (I/O) interface (not shown). The unit controller 35 can include fewer or additional components.

The TRU 15 also includes a closed refrigeration circuit (reference 12 in FIG. 2), which is controlled by the unit controller 35. The unit controller 35 controls the refrigeration circuit of the TRU 15 to obtain a desired state (e.g., temperature, humidity, air quality, etc.) of the interior space 50. In particular, the unit controller 35 may be in wired or wireless communication with one or more sensing devices that are used to measure a number of operating conditions of the TRU 15, such as the box temperature, ambient temperature, and operating parameters of the TRU 15, such as evaporator temperature, pressures, etc. in order to allow the unit controller 35 to draw a conclusion on what action has to be taken to achieve the desired state. For example, the unit controller 35 may compare the current state (e.g. box temperature and ambient temperature) with a target state (e.g. a set point temperature for the box) and regulate the current refrigeration capacity delivered by the TRU 15 accordingly. This may be done by sending control signaling to various control devices of the TRU 15, such as refrigeration throttling valves, dampers etc., which control the movement of the refrigerant through the refrigeration circuit.

The TRU 15 further includes a power bay (not shown), which houses a combustion engine (e.g., diesel engine, etc.), that can provide power to drive the compressor and other components (e.g. fans) of the refrigeration circuit. The power bay also houses an on-board electric motor which can provide power to drive the compressor and other components instead of the combustion engine, when plugged into electric standby (e.g. a 3-phase power socket).

The unit controller 35 itself is powered by a power module (not shown), which can include one or more power sources. The power sources receive electrical power from a generator machine (e.g., a belt-driven alternator, a direct drive generator, etc.) that is mechanically driven by the prime mover of the combustion engine or electric motor of the power bay.

Figure 2:
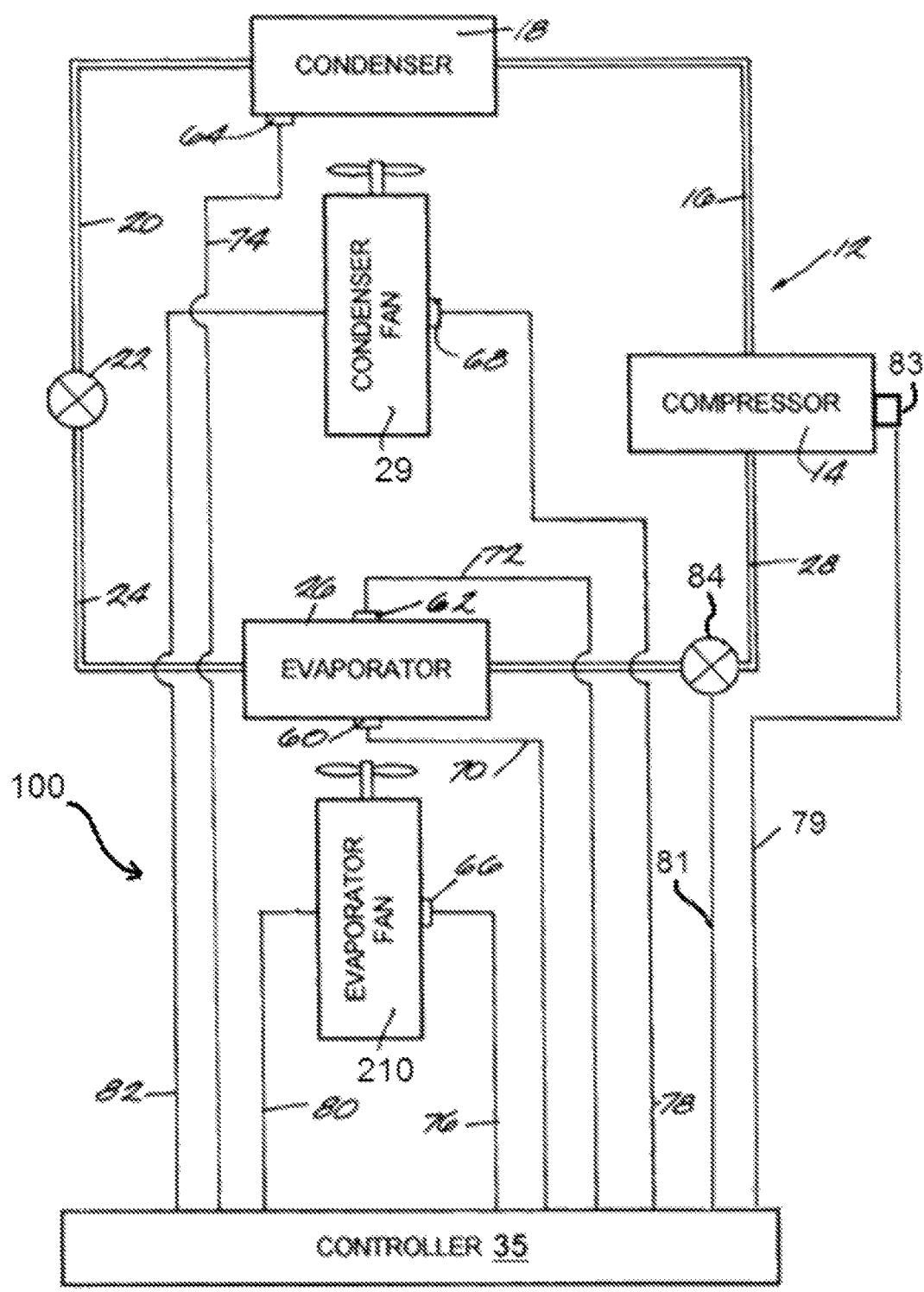
FIG. 2 schematically illustrates a transport refrigeration unit (TRU) of the TRS of FIG. 1.

FIG. 2 schematically illustrates the TRU 15 of FIG. 1 in greater detail. As shown, the TRU 15 includes not only the refrigeration circuit 12 and unit controller 35 described above, but also a condenser fan 29 and an evaporator fan 210.

The refrigeration circuit 12 includes a compressor 14, a discharge line 16, a condenser 18, a condenser output line 20, an expansion valve 22, an evaporator input line 24, an evaporator 26, a suction line 28 and an Electronic throttling valve (ETV) 84 on the suction line 28. The refrigerant in its various states flows through the refrigeration circuit 12 in a manner substantially as described above in the background section.

It will be appreciated here that FIG. 2 illustrates an example refrigeration circuit that is suitable for use with the present disclosure and that the present disclosure is applicable to any refrigeration cycle, such as one in which a heat exchanger is provided on the suction line.

The unit controller 35 forms part of a wider controller circuit 100 which includes a compressor speed (Comp RPM) sensor 83, an evaporator air inlet temperature (EAIT) sensor 60, an evaporator air output temperature (EAOT) sensor 62, a condenser air inlet temperature (CAIT) sensor 64, an evaporator fan speed (Evap RPM) sensor 66 and a condenser fan speed (Cond RPM) sensor 68. The electronic throttling valve position (ETWP) is set by the unit controller 35 and is therefore known to the unit controller 35 at all times without the need for a sensing device. Additionally or alternatively to the EAIT sensor 60, the EAOT sensor 62, the CAIT sensor 64, the Evap RPM sensor 66, and the Cond RPM sensor 68, there may be provided a suction line pressure (PVIP) sensor and a condenser discharge pressure (PGOP) sensor (both of which are not shown). The controller circuit 100 may also include sensors for measuring the box temperature of an internal space to be conditioned and the ambient temperature outside that space.

Each sensor may be wiredly coupled (e.g. via wire harnesses) or wirelessly coupled to the controller 35. In the specific arrangement shown, the EAIT sensor 60 is coupled to the controller 35 by an EAIT line 70. The EAOT sensor 62 is coupled to the controller by an EAOT line 72. The CAIT sensor 64 is coupled to the controller 35 by a CAIT line 74. The Evap RPM sensor 66 is coupled to the controller 35 by an Evap RPM line 76. The Cond RPM sensor 68 is coupled to the controller 35 by a Cond RPM line 78. The Comp RPM sensor 83 is coupled to the controller 35 by a Comp RPM line 79. In addition, the controller 35 is electrically coupled to the evaporator fan 210 by an evaporator fan control line 80, the electronic throttling valve 84 by an electronic throttling valve control line 81 and the condenser fan 29 by a condenser fan control line 82.

As mentioned above, in conventional arrangements the condenser fan speed and thus the condenser airflow are typically fixed and directly proportional to the fixed speed of the prime mover. In contrast to such arrangements, however, the present disclosure is concerned with a variable-speed condenser fan 29, which is driven in rotation by a DC or AC fan motor (not shown) that is powered by the power module of the TRU 15. For example, the AC fan motor may be provided with a variable frequency drive to vary and set the rotational speeds independently of the speed of the prime mover. A DC fan motor may be an Electronically Commutated Motor (ECM), a Brushless DC Motor (BLDC), etc. that provides variable speed control.

The speed of the condenser fan 29 is controlled and set by the unit controller 35. For example, the speed of the motor is regulated according to a pulse-width-modulation (PWM) signal or an analogue voltage signal that is supplied from the TRU controller 35 to a controller on the fan motor, which receives this signal and controls the fan speed accordingly.

In a first mode of operation, the fan speed (and thus condenser airflow) is varied in real-time during operation of the TRU 15 based on the current refrigeration demand of the TRU 15. The first mode of operation is to be used when, for example, the TRU 15 operates on cool mode i.e. during a temperature pull-down operation or while maintaining a set-point temperature for both continuous (modulation) and cycle sentry operation. The first mode of operation may also be implemented for fresh and frozen box temperatures.

In the first mode, when the refrigeration demand decreases, the condenser fan speed will automatically be decreased to operate at lower rotational frequencies, and/or when the refrigeration demand increases, the condenser fan speed will automatically increase to operate at higher rotational frequencies. In this way, the power consumed by the condenser fan 29 will be reduced when the condenser fan 29 operates below full speed (e.g. in low refrigeration demand conditions), whilst ensuring that the condenser fan 29 is driven at the appropriate speed to meet the current refrigeration demand of the system. The first mode of operation will now be described further with respect to FIGS. 3 to 6.

Figure 3:
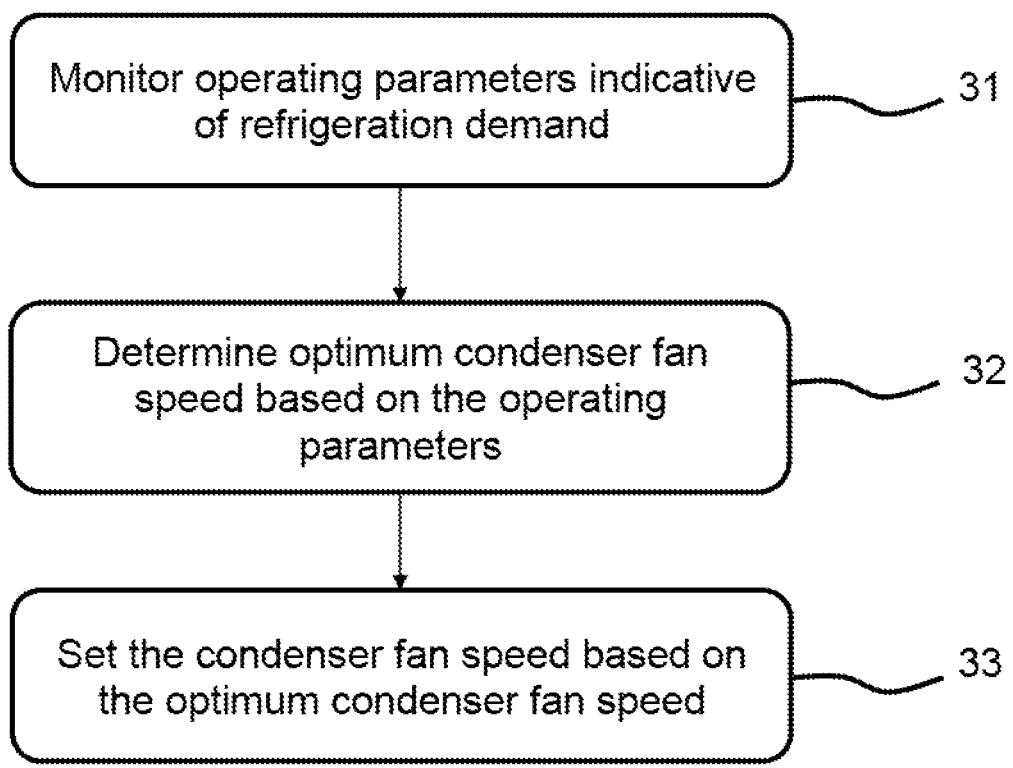
FIG. 3 is a flow chart schematically illustrating the control logic and processing steps to be executed by a unit controller of the TRU when operating in a first mode of operation to determine an optimum condenser fan speed to maximise system efficiency.

FIG. 3 is a flow chart schematically illustrating the control logic and processing steps to be executed by the unit controller 35 of the TRU 15 when operating in the first mode of operation.

The unit controller begins at step 31, at which point it monitors in real-time a set of plural operating parameters of the refrigeration circuit 12 that are to be used at step 32 to determine an optimum condenser fan speed to maximise system efficiency. The set of plural operating parameters is indicative of the current refrigeration demand. In particular, the operating parameters in the set may be those that allow (and are used by) the unit controller 35 to determine a current refrigeration demand and to draw a conclusion on what action has to be taken to achieve a desired state in the box being conditioned.

In an embodiment, the operating parameters that are monitored at step 31 include (e.g. consist of) Comp RPM, CAIT, EAIT, Evap RPM and ETVVP (referred to hereafter as the first set of operating parameters). In an alternative embodiment, the operating parameters that are monitored include (e.g. consist of) Comp RPM, PVIP, PGOP and ETVVP (referred to hereafter as the second set of operating parameters). The operating parameters are monitored using the plurality of sensors of the controller circuit 100 of FIG. 2.

The unit controller 35 can be configured to monitor all of the operating parameters described above, such that the first and second sets of operating parameters can be used interchangeably for determining the optimum condenser fan speed at step 32. For example, the unit controller may be set (e.g. by the user) to use one of the sets, e.g. the first set, of operating parameters as a default for the determination, but switch to use the other set of parameters for the determination in the event that the unit controller 35 detects a failure of one of the corresponding sensors for the default set of operating parameters.

At step 32, the unit controller 35 determines the optimum speed at which to operate the condenser fan 29 in order to maximise system efficiency, based on the current operating parameter values.

The system efficiency of the TRU 15 when utilising power generated by the combustion engine of the power bay is given as:

System efficiency=refrigeration capacity (Watts)/fuel consumption (litres per hour)

The system efficiency of the TRU 15 when utilising the on-board electric motor of the power bay is given as:

System efficiency=refrigeration capacity (Watts)/ power consumption (Watts)

The determination at step 32 is, in embodiments, based on a predetermined model of system efficiency, which is a function of the set of operating parameters being monitored and condenser fan speed. The predetermined model approximates the relationship between condenser fan speed, system efficiency (in particular refrigeration capacity and fuel/power consumption) and the set of operating parameters. To facilitate this, a series of simulations of the TRU 15 is executed by a computer processor beforehand, in order to model the relationships between condenser fan speed and system efficiency for different values of the set(s) of operating parameters that are to be monitored at step 31. The unit controller 35 can then utilise that predetermined model at step 32 of the method of FIG. 3 to determine the fan speed that, for the current values of the set of operating parameters monitored at step 31, would produce a refrigeration capacity value and a fuel or power consumption value that yields the maximum system efficiency value according to the above equations. As will be described in further detail below, a number of different strategies may be employed to determine the optimum fan speed using the predetermined model.

After the unit controller 35 has determined an optimum condenser fan speed at step 32, the unit controller 35 will set (at step 33) the condenser fan to operate at a speed that is selected based on the optimum condenser fan speed. In embodiments, the condenser fan is operated at the optimum fan speed or as close as possible to the optimum fan speed. In any case, to set the speed of the condenser fan 29 the unit controller 35 will issue a speed instruction (PWM signal) along the condenser fan control line 82.

It will be appreciated that steps 31 to 33 of FIG. 3 may be continuously repeated during operation of the TRU 15 in real time, to ensure that the optimum fan speed is realised throughout its operation.

Figure 4:
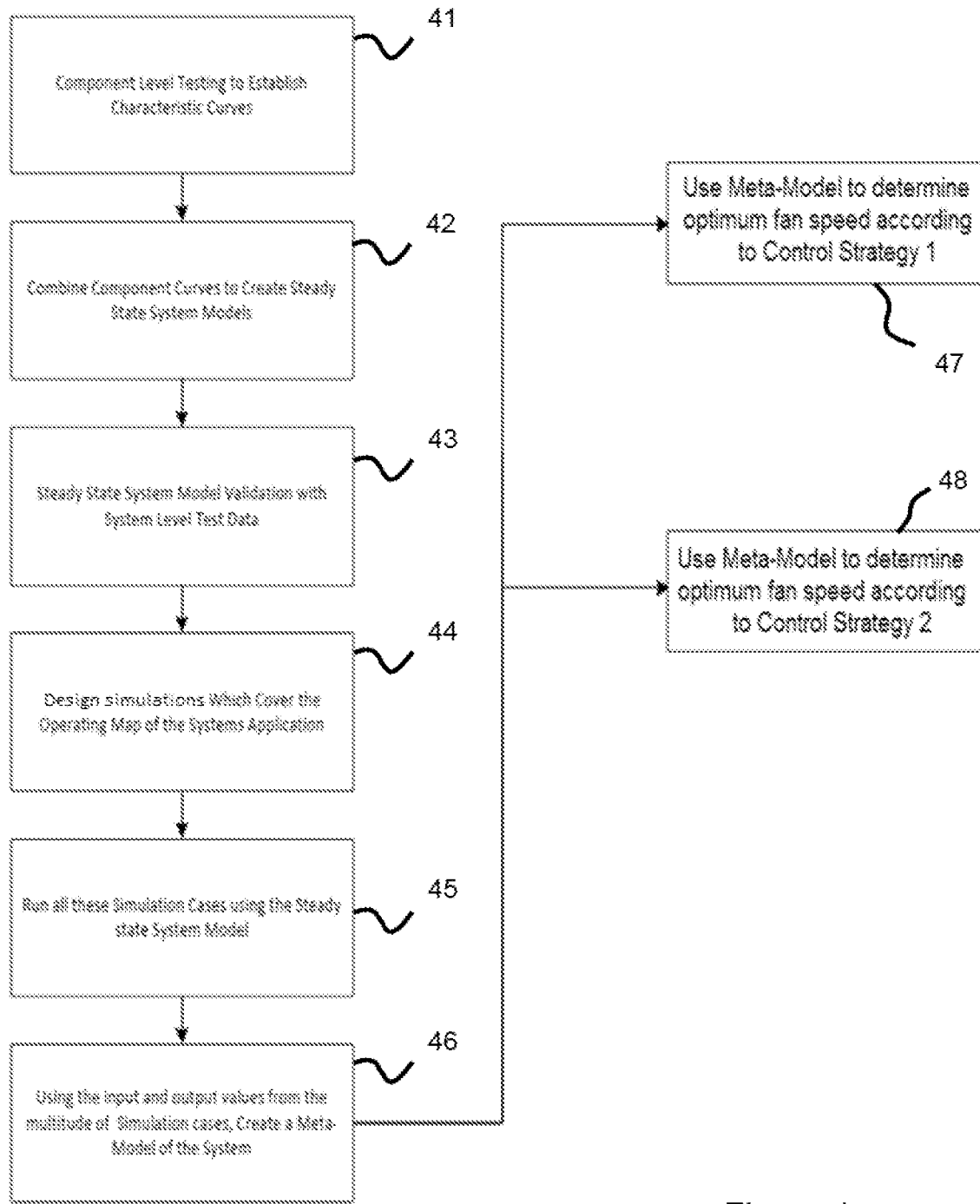
FIG. 4 is a flow chart illustrating a simulation and modelling process for the first mode of operation.

FIG. 4 is a flow chart illustrating the simulation and modelling process described above with respect to step 32 of FIG. 3.

The process begins by firstly testing the actual operation of each component of the TRU 15, such as the refrigeration circuit components, condenser and evaporator fans etc., to determine their respective operating characteristic behaviours (step 41 of FIG. 4). The operation characteristics of each component of the TRU 25 may be expressed mathematically in the form of a characteristic curve, i.e. a curve defining the relationships between the performance and various operating variables of the component.

The characteristic curves for respective components are then combined at step 42 to generate (with a computer processor) a mathematical model of the TRU 15, a so-called "steady-state system model". The steady-state system model approximates the performance of the system in that it receives, as an input, a respective permutation of operating conditions and operating parameter values for key components in the TRU 15, such as CompRPM, CAIT, EAIT and superheat setting, and outputs a value for refrigeration capacity (i.e. Watts), a value for fuel consumption (litres per unit time) for when the model simulates a combustion engine powered system, and/or a value for power consumption (Watts) for when the model simulates an electrically powered system.

The accuracy of the steady-state system model can be validated and refined at step 43, if necessary, by comparing the inputs and outputs of test simulations of the computer generated model with physical test data ("System Level Test Data") obtained by operating the physical TRU 15 that has been modelled.

At step 44, a series of simulation cases to model the system performance for the entire operating map of the system is designed. In particular, a plurality of respective permutations of operating conditions (e.g. ambient temperatures) and operating parameters for the components in the TRU 15 is determined, so that these may be used as inputs to the steady-state system model to simulate, at step 45, the performance of the TRU 15 across the entire operating map of the system. The simulations may be carried out with a wide range of compressor speeds, ambient temperatures (e.g. ranging from −30 to 55° C.), evaporator air inlet temperatures (e.g. ranging from −35 to 55° C.), varying evaporator fan speeds and/or electronic throttling valve positions, etc.

After running the simulation cases using the steady state system model, the process proceeds to step 46 at which the resulting simulation data, i.e. the plural sets of input data and corresponding output data (refrigeration capacity and fuel or power consumption), is subjected to statistical analysis methods to determine the model of system efficiency, i.e. a model of the relationship between condenser fan speed, system efficiency and the set of operating parameters to be used for the determination at step 32 of the method described above with respect to FIG. 3.

The predetermined model can be regarded as a metamodel that represents the input and output relations of the steady-state model. In this embodiment, the metamodel receives as inputs, a condenser fan speed and also the values for a respective one of the sets of operating parameters that are to be monitored by the unit controller 35 in accordance with the present disclosure. In that regard, there is at least one metamodel determined for each of the first set of operating parameters and the second set of operating parameters described above with regard to step 31 of the method of FIG. 3.

The outputs of the metamodel are, in this embodiment, a system refrigeration capacity, fuel consumption and/or electric power consumption, and optionally system efficiency. In an embodiment, for each set of operating parameters, there is one metamodel of system refrigeration capacity and engine power consumption, and another metamodel of system refrigeration capacity and electric power consumption.

Various statistical analysis techniques that are known in the art may be used to derive the metamodel(s) in step 46. However, in embodiments, a neural network, Kriging or regression model based method is selected and used for this purpose.

After the metamodel(s) is generated at step 46, the metamodel is used to determine the optimum condenser fan speed which in turn is used to control the operation of the condenser fan. The unit controller will determine and use the optimum condenser fan speed to control the operation of the condenser fan according to either a first control strategy or a second control strategy, which are both available to the controller (and, e.g., selectable by the user) as is shown at step 47 and step 48 of FIG. 4 respectively.

It will be appreciated here that steps 41 to 46 described above for simulating and modelling the TRU 15 and in particular system efficiency will be performed in advance of operation of the refrigeration system in accordance with the present disclosure. That is the Metamodel(s) is pre-determined and created offline at an initial stage prior to operation of the TRU 15 (e.g. by a separate computer processor to the unit controller 35 or wider TRU 15), for later use to determine the optimum fan speed.

Figure 5:
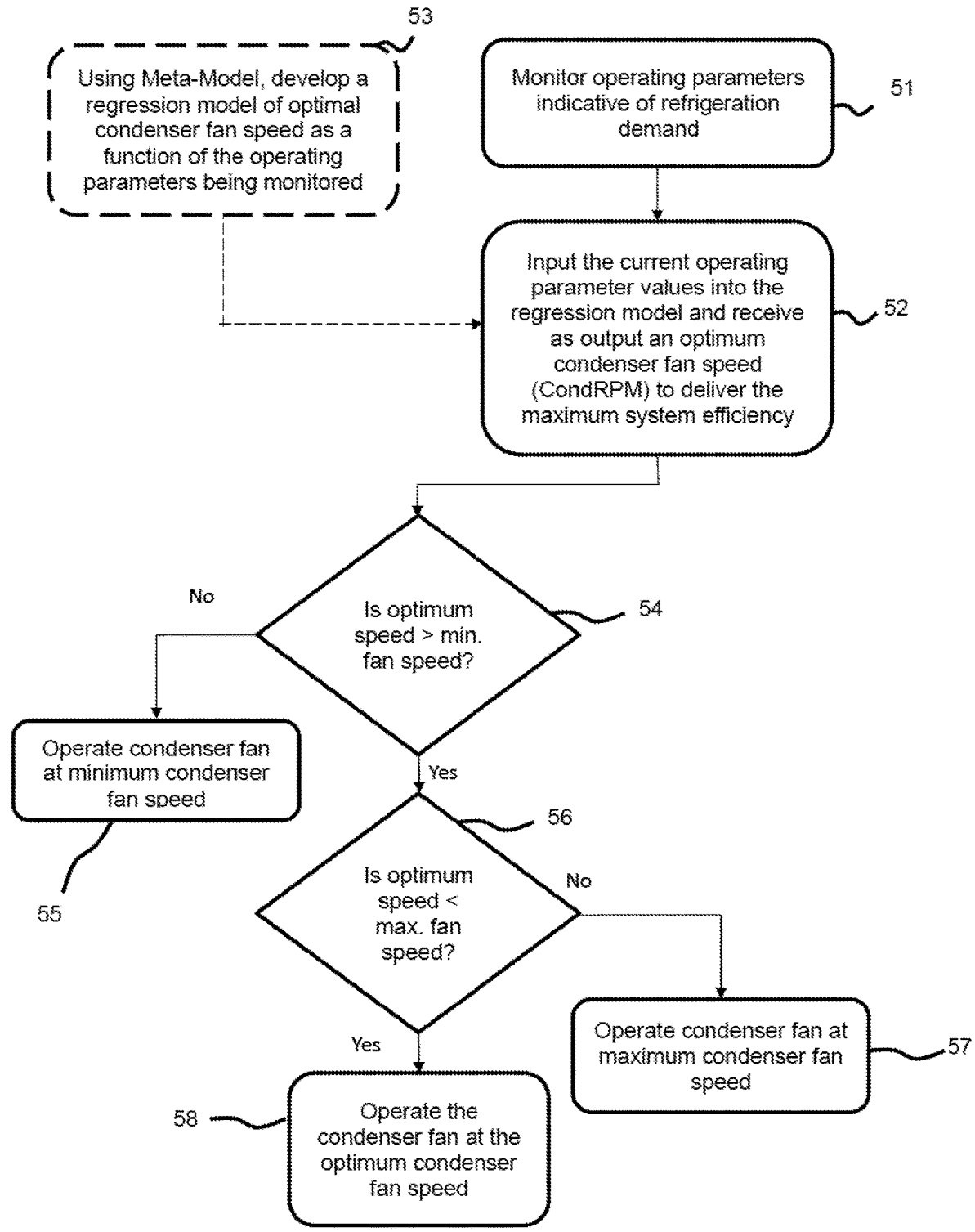
FIG. 5 is a flow chart schematically illustrating the control logic and processing steps for determining and implementing an optimum fan speed in accordance with a first control strategy of the first mode of operation.

FIG. 5 is a flow chart schematically illustrating the control logic and processing steps of FIG. 3 in greater detail, particularly when the unit controller is operating to determine and use the optimum fan speed according to the first control strategy.

The unit controller begins at step 51 by monitoring the set of operating parameters of the refrigeration circuit 12 in real-time, as described above with reference to step 31 of FIG. 3.

The determination of optimum condenser fan speed is carried out at step 52 by inputting the current values of the set of operating parameters being monitored into a regression model of optimum condenser fan speed, where the regression model has been predetermined for the set of operating parameters in question. The regression model is expressed as a function of the set of operating parameters being monitored and outputs the optimum condenser fan speed based on a predetermined relationship between the set of operating parameters (or rather possible values thereof) and the optimum condenser fan speed.

The predetermined relationship has been predetermined based on the metamodel determined at step 46 of FIG. 4. This was done by using the metamodel to perform a regression analysis to examine the relationship between the optimum fan speed and the set of operating parameters to be monitored. For example, the metamodel that corresponds to the set of operating parameters to be monitored at step 51 was used to determine, for respective permutations of values for the set of operating parameters in question, the fan speed at which system efficiency is maximised.

Any suitable regression analysis technique may be used for this purpose. In an embodiment, however, for a given permutation of operating parameter values, those operating parameter values are inputted to the metamodel together with a given, e.g. selected, value of condenser fan speed. The metamodel then outputs the corresponding refrigeration capacity and fuel or power consumption. This process is repeated across a, e.g. the entire, range of possible condenser fan speeds, so that the system efficiency (i.e. the ratio of refrigeration capacity to fuel or power consumption) that can be realised across that range of fan speeds is known. The optimum fan speed for the permutation of operating parameter values in question is then determined and identified as the speed at which the maximum system efficiency is achieved. The optimum fan speed is then determined in the same manner for a plurality of respective permutations of operating parameter values, and a curve function is fitted to the plurality of optimum fan speeds for the respective permutations of operating parameter values, where the curve function is to be used as the regression model.

In alternative embodiments, instead of a regression model, the predetermined relationship between the set of operating parameters and the optimum condenser fan speed may be in the form of a lookup table. Accordingly, there may be a lookup table stored in memory, wherein the lookup table has a plurality of entries, e.g. one entry for a respective permutation of operating parameter values. Each entry in the table includes data indicating the optimum fan speed (as determined by the regression analysis) for the permutation of operating parameter values to which the entry corresponds.

It will be appreciated that there may be more than one regression model or lookup table generated for the system, i.e. one for each different set of operating parameters to be monitored by the unit controller 35. That is, a first regression model or lookup table may receive, as an input, the current values of Comp RPM, CAIT, EAIT, Evap RPM and ETVVP, and output an optimum condenser fan speed to deliver the maximum system efficiency for those operating parameters. A second regression model or lookup table may receive, as an input, the current values of Comp rpm, PVIP, PGOP and ETVVP and output an optimum condenser fan speed to deliver the maximum system efficiency for those operating parameters. Where the controller is configured to set the condenser fan speed based on the current values of the first set of operating parameters interchangeably with the current values of the second set of operating parameters, the controller may utilize the regression model or lookup table which corresponds to the set of operating parameters in question.

As represented by the dashed line at step 53 of FIG. 5, the regression model(s) and/or lookup table(s) is generated prior to operation of the TRU 15 and after determining the metamodel at step 46 of FIG. 4. However, the regression model(s) and/or lookup table(s) is stored in a memory of the unit controller 35 for subsequent use at step 52 to determine in real-time the optimum fan speed for the current operating parameters of the system.

After determining the optimum fan speed at step 52, the unit controller 35 will cause the condenser fan 29 to operate at a speed that corresponds as closely as possible to the optimum speed. In this regard, it will be appreciated that in practice the condenser fan may be operable across only a sub-range of the condenser fan speeds with which the metamodel was created. Therefore, in embodiments, the unit controller will determine whether the optimum fan speed determined at step 52 falls within a pre-determined range of possible fan speed across which the condenser fan can operate, and operate the condenser fan at an appropriate speed based on that determination.

While the control strategy outputs the optimum condenser fan speed, the controller will ensure that the condenser fan only operates between its predefined minimum and maximum fan speeds. In particular, the unit controller 35 will determine, at step 54, whether the determined optimum condenser fan speed is greater than the minimum speed at which the condenser fan can operate. If the optimum speed is equal to or less than the minimum fan speed, the unit controller 35 will proceed to step 55 at which the condenser fan is operated at the minimum fan speed.

If, however, it is determined that the optimum condenser fan speed is greater than the minimum fan speed, the unit controller 35 will proceed to determine, at step 56, whether the optimum condenser fan speed is less than the maximum speed at which the condenser fan can operate. If the optimum speed is equal to or greater than the maximum fan speed, the unit controller 35 will proceed to step 57 at which the condenser fan is operated at the maximum fan speed. If the optimum condenser fan speed is less than the maximum fan speed, the unit controller 35 will proceed to step 58 at which the condenser fan is operated at the determined optimum condenser fan speed.

In each of the above cases, the unit controller 35 will issue an appropriate speed instruction along the condenser fan control line (e.g. harness) to operate the condenser fan.

Figure 6:
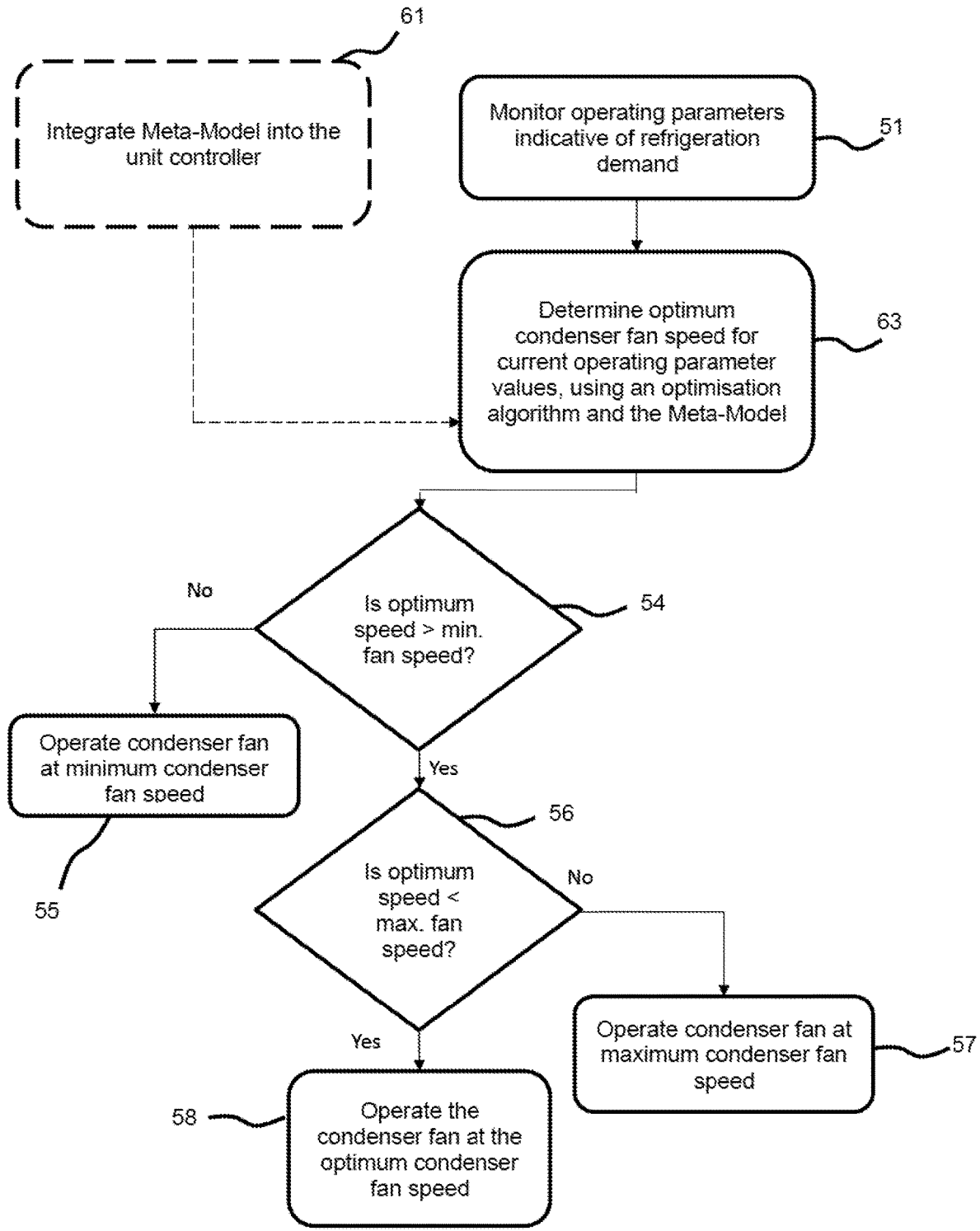
FIG. 6 is a flow chart schematically illustrating the control logic and processing steps for determining and implementing an optimum fan speed in accordance with a second control strategy of the first mode of operation.

FIG. 6 is a flow chart schematically illustrating the control logic and processing steps of FIG. 3 in greater detail, particularly when the unit controller is operating to determine and use the optimum fan speed according to the second control strategy.

A number of the control logic and processing steps carried out in the embodiment of FIG. 6 correspond to those of the embodiment described with respect to FIG. 5 (and for that reason like processing steps are labelled with like reference numerals in FIGS. 5 and 6). The detail of such steps will not be repeated here for brevity.

The control strategy of FIG. 6 differs from that of FIG. 5 in that, rather than pre-determining and using a regression model or lookup table as described above, the metamodel that corresponds to the set of operating parameters being monitored at step 51 (i.e. the metamodel corresponding to the first set of operating parameters or the metamodel corresponding to the second set of operating parameters, or both) is itself stored in a memory of the unit controller 35 at an initialisation step, i.e. step 61 of FIG. 6, for later use during operation of the TRU 15 to determine in real-time the optimum condenser fan speed.

In particular, the metamodel is used at step 63 to determine, for the current values of the set of operating parameters being monitored, the fan speed at which system efficiency is maximised. To do this, the unit controller is configured to perform an optimisation algorithm, using the metamodel, to determine and select a condenser fan speed (from a range of possible fan speeds) that yields the highest system efficiency. It will be appreciated that, where the controller is configured to set the condenser fan speed based on the current values of the first set of operating parameters interchangeably with the current values of the second set of operating parameters, the controller may perform the optimisation algorithm using the metamodel corresponding to the first or second set of operating parameters. Where one of the sets of operating parameters are used as a default, the controller may perform the optimisation algorithm using the metamodel corresponding to the default set of operating parameters, and switch to perform the optimisation algorithm using the metamodel corresponding to the other set of operating parameters if the controller detects a failure of one or more sensors for monitoring the default set of operating parameters.

Any suitable optimisation algorithm may be used for this purpose. However, in some cases this is done using an optimisation algorithm which inputs to the metamodel the current operating parameter values and a given, e.g. selected, condenser fan speed, and receives, as an output from the metamodel, the refrigeration capacity, corresponding fuel or power consumption (depending on which metamodel is used), and in some cases system efficiency. The optimisation algorithm then repeats this step for respective condenser fan speeds across a range of condenser fan speeds. Based on the outputs obtained from the metamodel across the range of condenser fan speeds, the unit controller determines the fan speed at which the system efficiency is at its maximum value. The unit controller will then proceed through steps 54 to 58 of FIG. 6 in a manner as described above with respect to steps 54 to 58 of FIG. 5, to issue an appropriate speed instruction to the condenser fan along the condenser fan control line.

In the manner described above with respect to FIGS. 3 to 6, the present disclosure can improve system efficiency and thus fuel or power economy, as compared to previously considered arrangements in which the condenser fan is operated at a fixed speed that is dependent on the rotational speed of the prime mover. It will be appreciated that the fuel or power savings achieved through setting the condenser fan speed according to the first mode of operation will differ with different box and ambient conditions. However, at prominent customer operating conditions (Box/Ambient temperatures: −25/8° C. and −25/19° C.), at least, simulations show that fuel savings of up to 7% can be achieved during pull-down.

Although the present disclosure has been described above with respect to a first mode of operation in which the fan speed is set to increase system efficiency, in embodiments the unit controller 35 is further configured to operate in accordance with a second mode of operation, in which the fan speed is set to maximise refrigeration capacity regardless of system efficiency.

It will be appreciated that the unit controller 35 may be configured to alternate between the first mode of operation and the second mode of operation. That is, in embodiments the unit controller 35 is configured to, in response to receiving a user input, switch between the first mode of operation in which the fan speed is controlled to maximise efficiency, and the second mode of operation in which the fan speed is controlled to maximise refrigeration capacity. This dual functionality provides a more versatile and sophisticated system than one which is configured to operate according to only one of those modes of operation.

Initiation of the second mode of operation may be triggered by a user-operable mechanical switch located on the TRU 15, or by selection of that mode of operation by a user on a computer (e.g. an input/output interface) of the unit controller 35, for example.

Figure 7:
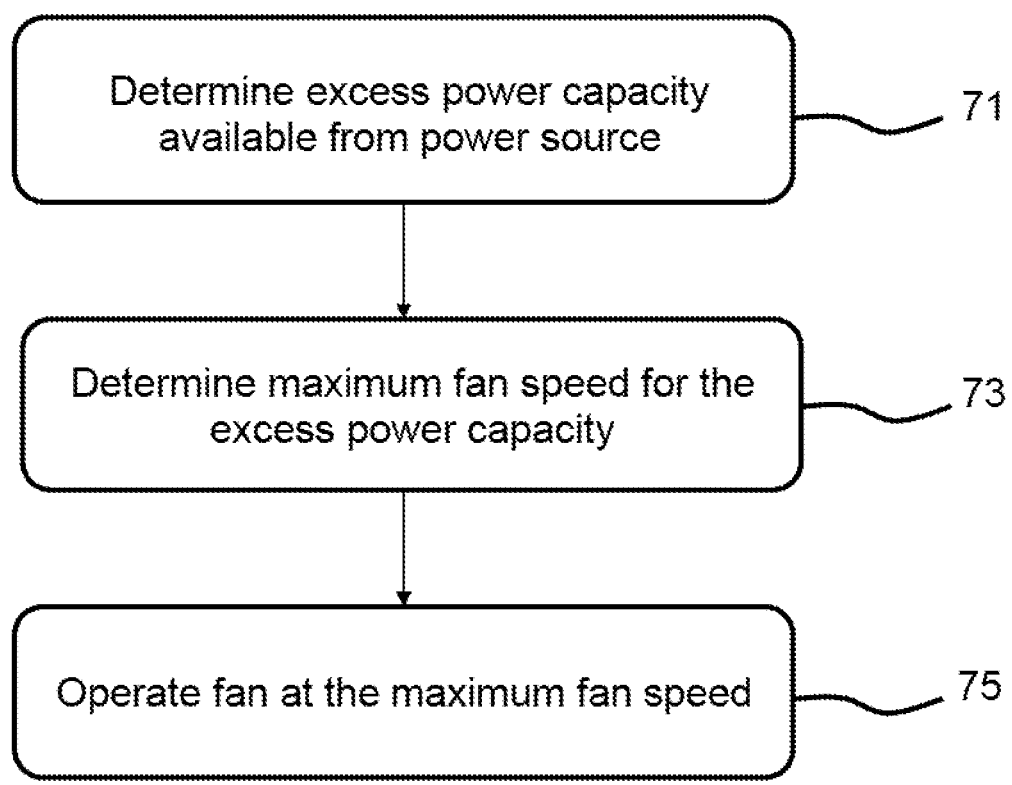
FIG. 7 is a flow chart schematically illustrating the control logic and processing steps to be executed by a unit controller of the TRU when operating in a second mode of operation to determine a condenser fan speed that maximises system capacity.

FIG. 7 is a flow chart schematically illustrating the control-logic and processing steps carried out by a unit controller of the TRU 15 when operating in the second mode of operation.

The second mode of operation begins at step 71 of FIG. 7 with the unit controller 35 determining an excess power capacity that is available (if at all) from the power source (e.g. a generator and active rectifier, where the generator is driven by the prime mover of the power bay), in order for that excess power capacity to be used by the condenser fan to operate at the highest possible speed. This may be used advantageously to maximise the refrigeration capacity and achieve faster pull-down and recovery times.

Accordingly, at step 71, the unit controller 35 reviews the maximum power capacity of the power source and determines the current power draw from the power source based on the current generator speed. Based on the current power draw and total power capacity of the power source, the unit controller 35 determines the excess power capacity that is available (beyond the current power draw) for use by the condenser fan while maintaining the current speed of the prime mover (and thus compressor).

At step 73, the unit controller 35 determines the maximum speed at which the condenser fan can operate when utilizing the excess power capacity from the power source. This may be a determination of the maximum average voltage and current that can be supplied to the motor that drives the condenser fan 29 in this embodiment.

At step 75, after the maximum fan speed has been determined, the unit controller issues an instruction or other signalling along the condenser fan control line 82 to operate the condenser fan 29 at the maximum speed determined at step 73.

It will be appreciated that steps 71 to 75 of FIG. 7 may be continuously repeated during operation of the TRU 15 in real time, to ensure that the maximum fan speed that is possible at any given time is realised. Further, by utilising only power that is available in excess of the current power draw of the power source to drive the fan, the unit controller ensures that the maximum fan speed can be realised without compromising on operation of any individual components of the system. That is, the unit controller 35 will ensure that the condenser fan 29 does not draw more power than what can be currently supplied by the power source.

In view of the above, it can be seen that the present disclosure provides a versatile refrigeration system that can be used advantageously either to maximise system efficiency or to maximise refrigeration capacity. This is particularly advantageous over previously considered arrangements in which this level of control and optimisation is not provided.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. That is, the present disclosure is not limited to the embodiments above-described and except where mutually exclusive, any of the features may be employed separately or in combination with any other features and the disclosure extends to and includes all combinations and sub-combinations of one or more features described herein.

The word "embodiment" as used within this specification may, but does not necessarily, refer to the same embodiment. This specification and the embodiments described are examples only. Other and further embodiments may be devised without departing from the basic scope thereof, with the true scope of the disclosure being indicated by the claims that follow.

The invention claimed is:

1. A refrigeration system comprising:
a refrigeration circuit that includes at least a compressor, a condenser, an expansion valve and an evaporator;
a variable-speed condenser fan; and
a controller configured to, in a first mode of operation, monitor a current refrigeration demand of the refrigeration system and to set a speed of the condenser fan based on the current refrigeration demand of the refrigeration system,
wherein the controller is configured to:
monitor a set of current operating parameters of the refrigeration circuit that is indicative of the current refrigeration demand; and
set the condenser fan speed based on the set of current operating parameters,
wherein the controller is configured to set the speed of the condenser fan based on a predetermined model of system efficiency, which is a function of the set of current operating parameters and condenser fan speed,
wherein:
the controller is configured to set the speed of the condenser fan based on a predetermined relationship between the set of current operating parameters and a condenser fan speed at which system efficiency will be at its maximum for the set of current operating parameters; and
the predetermined relationship has been determined by performing a regression analysis using the predetermined model, and
wherein:
the predetermined relationship is in the form of a regression model, which is stored in a memory that is accessible by the controller; and
the controller is configured to:
input the set of current operating parameters into the regression model;
receive, as an output from the regression model, the condenser fan speed at which the system efficiency will be at its maximum for the set of current operating parameters; and
set the condenser fan to operate at a speed that is selected based on the condenser fan speed at which the system efficiency will be at its maximum for the set of current operating parameters.

2. A refrigeration system comprising:
a refrigeration circuit that includes at least a compressor, a condenser, an expansion valve and an evaporator;
a variable-speed condenser fan; and
a controller configured to, in a first mode of operation, monitor a current refrigeration demand of the refrigeration system and to set a speed of the condenser fan based on the current refrigeration demand of the refrigeration system,
wherein the controller is configured to:
monitor a set of current operating parameters of the refrigeration circuit that is indicative of the current refrigeration demand; and
set the condenser fan speed based on the set of current operating parameters, wherein the controller is configured to set the speed of the condenser fan based on a predetermined model of system efficiency, which is a function of the set of current operating parameters and condenser fan speed, wherein:
the controller is configured to set the speed of the condenser fan based on a predetermined relationship between the set of current operating parameters and a condenser fan speed at which system efficiency will be at its maximum for the set of current operating parameters; and
the predetermined relationship has been determined by performing a regression analysis using the predetermined model, and wherein the predetermined relationship is in the form of a lookup table, which is stored in a memory that is accessible by the controller; and the controller is configured to:
identify an entry in the lookup table that corresponds to the set of current operating parameters;
read from the entry data that is indicative of the condenser fan speed at which the system efficiency will be at its maximum for the set of current operating parameters; and
set the condenser fan to operate at a speed that is selected based on the condenser fan speed at which the system efficiency will be at its maximum for the set of current operating parameters.

3. The refrigeration system of claim 1, wherein the controller is configured to set the speed of the condenser fan based on the predetermined model of system efficiency by:
performing an optimization algorithm using the predetermined model, to determine a condenser fan speed at which system efficiency will be at its maximum for the set of current operating parameters.

4. The refrigeration system of claim 3, wherein performing the optimization algorithm comprises:
for each condenser fan speed of a group of predefined condenser fan speeds:
inputting the condenser fan speed in question and the set of current operating parameters into the predetermined model of system efficiency; and
receiving as output data from the predetermined model of system efficiency a refrigeration capacity value and a fuel or power consumption value; and
determining, based on the output data for the group of predefined condenser fan speeds, the predefined condenser fan speed for which the corresponding refrigeration capacity value and fuel or power consumption value yields the greatest system efficiency.

5. The refrigeration system of claim 1, wherein:
the refrigeration system comprises a power source for supplying power to at least the controller and the condenser fan; and
the controller is configured to, in a second mode of operation:
determine, based on a current power consumption and a predefined maximum power capacity of the power source, an excess power capacity available from the power source;
determine a maximum speed at which the condenser fan can operate when utilizing the excess power capacity from the power source; and
set the condenser fan to operate at the determined maximum speed.

6. The refrigeration system of claim 1, wherein the set of current operating parameters includes:
one or more of a compressor speed, a condenser air inlet temperature, an evaporator air inlet temperature, an evaporator fan speed and a throttling valve position; or
one or more of a compressor speed, a compressor suction pressure, a condenser discharge pressure and a throttling valve position.

7. The refrigeration system of claim 1, wherein the controller is configured to:
monitor a first set of current operating parameters and a second set of current operating parameters different from the first set of current operating parameters, each of which is indicative of the current refrigeration demand; and
set the condenser fan speed based on the first set of current operating parameters interchangeably with the second set of current operating parameters.

8. The refrigeration system of claim 7, wherein the controller is configured to:
set the condenser fan speed based on the first set of current operating parameters as a default in the first mode of operation, and to set the condenser fan speed based on the second set of current operating parameters if the controller detects a failure of one or more sensors for monitoring the first set of current operating parameters.

9. A refrigeration system comprising:
a refrigeration circuit that includes at least a compressor, a condenser, an expansion valve and an evaporator;
a variable-speed condenser fan; and
a controller configured to, in a first mode of operation:
monitor a set of current operating parameters of the refrigeration circuit that is indicative of a current refrigeration demand of the refrigeration system using a plurality of sensors;
perform an optimization algorithm using a predetermined model of system efficiency that is a function of the set of current operating parameters and condenser fan speed to determine a speed of the condenser fan at which system efficiency will be at its maximum for current values of the set of current operating parameters; and
set a speed of the condenser fan based on the determined speed of the condenser fan at which system efficiency will be at its maximum for the set of current operating parameters,
wherein performing the optimization algorithm comprises:
for each condenser fan speed of a group of predefined condenser fan speeds:
inputting the condenser fan speed in question and the set of current operating parameters into the predetermined model of system efficiency;
receiving as output data from the predetermined model of system efficiency a refrigeration capacity value and a fuel or power consumption value; and
determining, based on the output data for the group of predefined condenser fan speeds, the predefined condenser fan speed for which the corresponding refrigeration capacity value and fuel or power consumption value yields the greatest system efficiency.

10. The refrigeration system of claim 9, wherein:
the controller is configured to set the speed of the condenser fan based on a predetermined relationship between the set of current operating parameters and a condenser fan speed at which system efficiency will be at its maximum for the set of current operating parameters; and the predetermined relationship has been determined by performing a regression analysis using the predetermined model.

11. The refrigeration system of claim 10, wherein:

the predetermined relationship is in the form of a regression model, which is stored in a memory that is accessible by the controller; and the controller is configured to:

input the set of current operating parameters into the regression model;

receive, as an output from the regression model, the condenser fan speed at which the system efficiency will be at its maximum for the set of current operating parameters; and set the condenser fan to operate at a speed that is selected based on the condenser fan speed at which the system efficiency will be at its maximum for the current parameters.

\* \* \* \* \*